Figure 1:
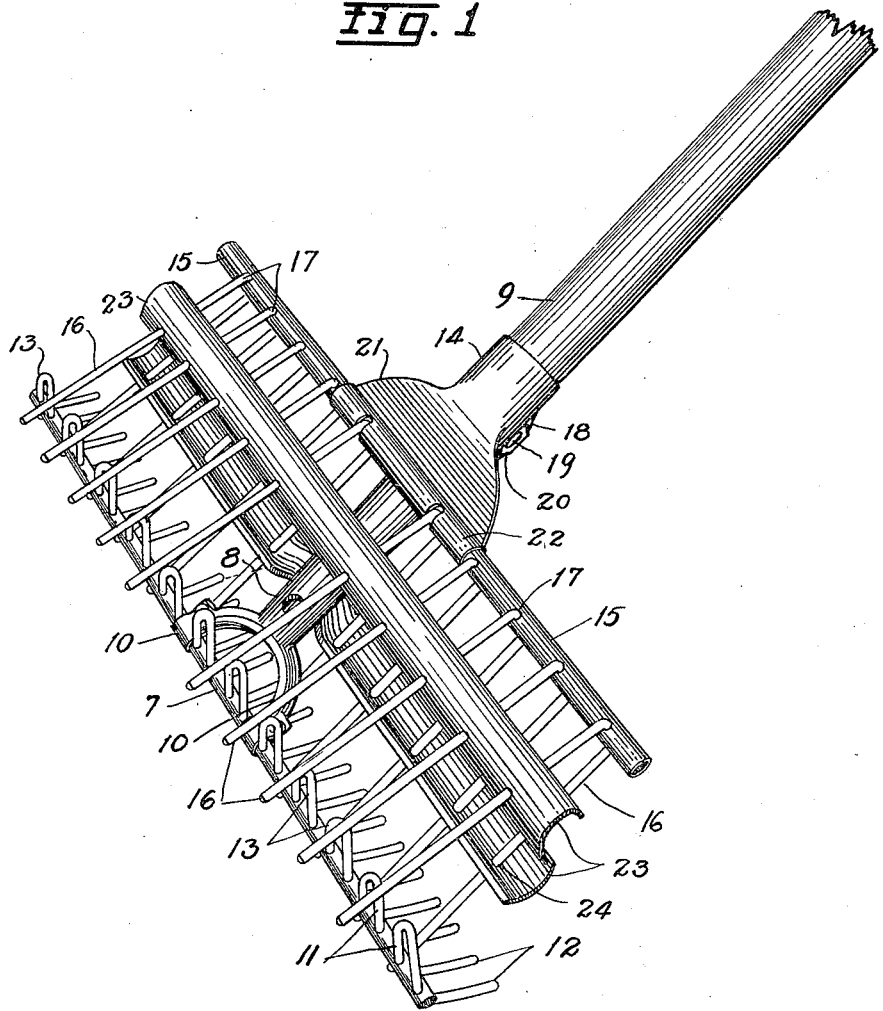

C. D. WRIGHT.
SELF CLEANING ATTACHMENT FOR RAKES.
APPLICATION FILED MAY 18, 1914.

1,137,825.

Patented May 4, 1915.
2 SHEETS—SHEET 1.

WITNESSES.
H. P. Palmer.
A. S. Phillips.

INVENTOR.
Charles D. Wright,
BY Chas C. Tillman
ATTY.

C. D. WRIGHT.
SELF CLEANING ATTACHMENT FOR RAKES.
APPLICATION FILED MAY 18, 1914.
1,137,825.
Patented May 4, 1915.
2 SHEETS—SHEET 2.
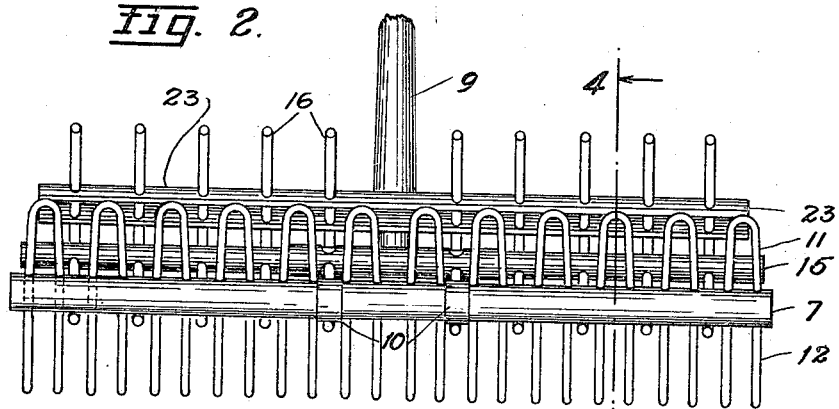
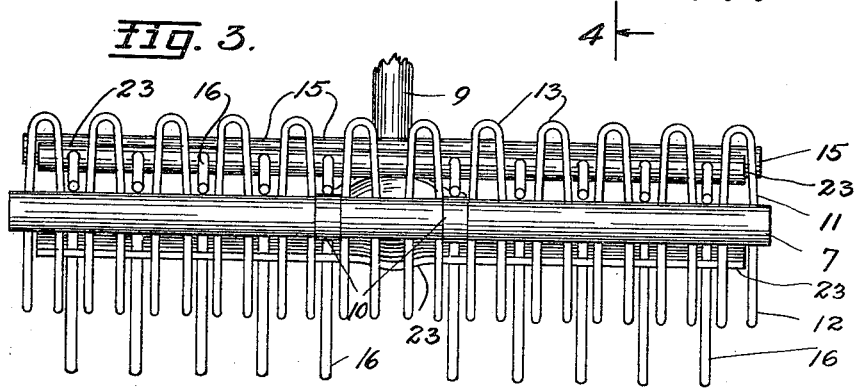
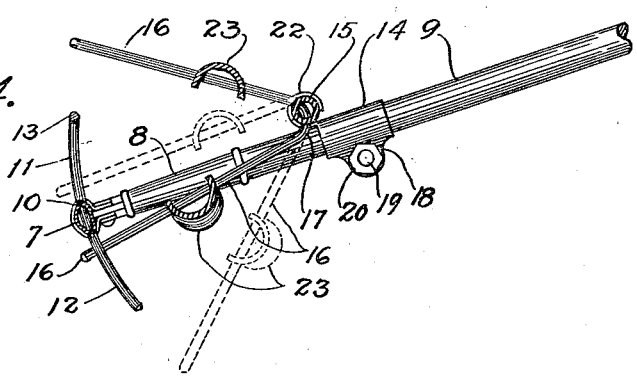
WITNESSES.
H. P. Palmer.
A. S. Phillips
INVENTOR.
Charles D. Wright,
BY Chas. C. Tillman
ATTY.

UNITED STATES PATENT OFFICE.

CHARLES D. WRIGHT, OF ADRIAN, MICHIGAN.

SELF-CLEANING ATTACHMENT FOR RAKES.

1,137,825.  Specification of Letters Patent.  Patented May 4, 1915.

Application filed May 18, 1914. Serial No. 839,238.

*To all whom it may concern:*

Be it known that I, CHARLES D. WRIGHT, a citizen of the United States, residing at the city of Adrian, in the county of Lenawee and State of Michigan, have invented certain new and useful Improvements in Self-Cleaning Attachments for Rakes, of which the following is a specification.

This invention relates to improvements in an attachment for rakes, and it consists in certain peculiarities of the construction, novel arrangement and operation of the various parts thereof as will be hereinafter more fully set forth and specifically claimed.

The principal object of the invention is to provide a simple and inexpensive attachment for rakes, and more especially for garden or lawn rakes, which can be easily applied to the handle thereof, for the purpose of automatically cleaning the rake-teeth, or removing therefrom, straw, leaves, litter, and the like, which so often clog the rake so as to prevent its teeth performing their proper functions, and which ordinarily have to be removed by the foot or hand of the operator.

Another object of the invention is to provide a rake attachment which will augment the capacity of the rake in raking leaves, straw and loose material, yet will also act as a self cleaner for the rake-teeth.

Other objects and advantages will be disclosed in the subjoined description and explanation.

In the accompanying drawings which serve to illustrate the invention—Figure 1 is a perspective view of an ordinary lawn rake, showing it equipped with my improved self-cleaning attachment and illustrating the parts in the posititons they will occupy when the lower teeth of the rake are filled with leaves, straw or litter; Fig. 2 is a rear view showing the parts in the same position as illustrated in Fig. 1; Fig. 3 is a similar view illustrating the positions the parts will occupy when the rake has been raised from the ground, and Fig. 4 is a cross sectional view taken on line 4—4 of Fig. 2, looking in the direction indicated by the arrows, but illustrating by dotted lines the position of the parts when the rake has been removed from the ground and the cleaning attachment has acted thereon.

Like numerals of reference refer to corresponding parts throughout the different views of the drawings.

The reference numeral 7 designates the rake-teeth support or bar, which may be made of any suitable length and material, but preferably tubular, as shown, and provided at about its middle with a handle socket 8 of the ordinary construction to receive the lower end of the rake handle 9. As is clearly shown in Figs. 1 and 4 of the drawings, the socket 8 is provided with prongs 10, which may be secured to the support 7 in any suitable maner. Extended transversely through the support 7 are a series of looped wires or members 11, which form teeth 12 and 13 above and below the support 7 for raking purposes. The members 11 are shown as being extended through suitable openings in the support 7, and fastened therein about midway between the ends of said members, but it will be understood that the support 7 may be provided with teeth of any suitable kind, which may be attached thereto in any desired manner, and that said teeth may or may not extend above and below the surfaces of the support therefor.

Mounted on the handle 9 just above the socket 8, is a clip or holder 14, for the support 15, of the cleaning arms 16 of the attachment, which arms are extended through suitable openings 17 in the support 15 at sufficient distances apart to extend between the rake teeth. The clip or holder 14 is made in the form of a split tube and of slightly resilient material and is provided at each of its edges with an apertured lug 18, through which apertures is extended a screw bolt 19 to engage a nut 20, which are employed for clamping the lugs 18 together, so as to cause the clip or holder 14 to be firmly secured on the rake handle. At its lower portion the holder 14 is provided with an extension 21, which has on its lower portion a bearing 22, in which the rod or support 15 for the cleaning arms 16 of the attachment is journaled for rotary movement.

As shown in Fig. 1, the extension 21 and bearing 22 of the holder 14, extend longitudinally in parallelism with the support 7 for the rake teeth. The arms 16 of each pair are located at angles to one another, as is clearly shown in Fig. 4, so that the lower arms will project between the teeth 12, while the upper ones are adapted to project between the teeth 13 of the rake. The upper arms 16 of the attachment are connected together by means of a bar 23 which is preferably about semi-circular in cross section, and is provided with transverse openings 24, through which the upper arms 16 of the attachment are extended. The lower arms 16 of the attachment are also connected together by means of a similar shaped bar 23 having openings 24 therein for the passage of the said arms. The bars 23 are employed to brace and give rigidity or strength to the arms 16, as well as for the purpose of adding weight thereto, so as to cause the shaft or support 15 of the attachment to automatically turn in its bearing 22 on the holder for said attachment. The bars 23 may be located at any suitable distance on the arms 16 from the support or shaft 15, but by preference in parallelism with said shaft, as is clearly shown in Fig. 1 of the drawings.

From the foregoing and by reference to the drawings, it will be readily understood and clearly seen that the holder 14, carrying the shaft 15 of the attachment can be slipped on the free end of the handle 9 and slid downwardly thereon to the proper point near the upper end of the socket 8, where said holder can be firmly secured with the shaft 15 in parallelism with the support 7 for the rake teeth by tightening the screw bolt 19 on said holder. When thus secured it is apparent that the arms 16 of the attachment will be in position to be interposed alternately between the teeth 12 and 13 of the rake, and that when the teeth 12 of the rake are being used on the ground, the lower arms of the attachment will also rest on the ground until sufficient litter or material gathered by the teeth 12 will cause said lower arms as well as the upper ones to be raised to about the position shown by continuous lines in Fig. 4, of the drawings, when by raising the rake from the ground, it is evident that the weight of the bars 23 and arms 16 of the attachment will cause them to assume about the position shown by dotted lines in said figure, thus forcing the accumulated litter, straw, leaves, etc., from between the teeth 12 of the rake. To use the teeth 13 of the rake, it is only necessary to turn the rake over, when the same operation of the attachment just above described will be repeated.

Having thus fully described my invention what I claim as new and desire to secure by Letters Patent is—

1. An attachment for rakes consisting of a holder having means to secure it to the rake handle, a support rotatably and transversely mounted on said holder, and arms arranged in divergently disposed rows and carried by said support and fixed thereto at one of their ends.

2. An attachment for rakes consisting of a holder having means to secure it to the rake handle, a support rotatably and transversely mounted on said holder, and divergently disposed and weighted arms carried by said support.

3. An attachment for rakes consisting of a holder having means to secure it to the rake handle, a support rotatably and transversely mounted on said holder, arms fixed to said support and arranged divergently in rows, and a bar mounted on each of said rows of arms.

4. The combination with a rake having a support carrying teeth and provided with a handle, of an attachment consisting of a holder having means to secure it to the handle of the rake, a shaft rotatably and transversely mounted on said holder, and divergently disposed arms carried by said shaft and extended to strike the said teeth carrying support in the movement of the shaft in either direction.

5. The combination with a rake having a support carrying teeth and provided with a handle, of an attachment consisting of a holder having means to secure it to the handle of the rake, a shaft rotatably and transversely mounted on said holder, divergently disposed arms carried by said shaft and extended above and below said teeth carrying support, and a bar mounted on the arms near the shaft which carries the same.

CHARLES D. WRIGHT.

Witnesses:
C. H. LEWIS,
L. A. TREAT.

Copies of this patent may be obtained for five cents each, by addressing the "Commissioner of Patents, Washington, D. C."